United States Patent
Galloway et al.

(10) Patent No.: US 12,157,232 B2
(45) Date of Patent: Dec. 3, 2024

(54) ROBOTIC APPLICATION EQUIPMENT MONITORING AND PREDICTIVE ANALYTICS

(71) Applicant: Fanuc America Corporation, Rochester Hills, MI (US)

(72) Inventors: Thomas R. Galloway, Commerce Township, MI (US); Bradley O. Niederquell, Troy, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 677 days.

(21) Appl. No.: 16/207,686

(22) Filed: Dec. 3, 2018

(65) Prior Publication Data

US 2019/0176332 A1 Jun. 13, 2019

Related U.S. Application Data

(60) Provisional application No. 62/596,193, filed on Dec. 8, 2017.

(51) Int. Cl.
*B25J 9/16* (2006.01)
*B25J 9/00* (2006.01)
*G05B 19/05* (2006.01)

(52) U.S. Cl.
CPC ........... *B25J 9/1674* (2013.01); *B25J 9/0084* (2013.01); *G05B 19/05* (2013.01); *B25J 9/161* (2013.01); *G05B 2219/14083* (2013.01)

(58) Field of Classification Search
CPC ........ B25J 9/1674; B25J 9/0084; B25J 9/161; G05B 19/05; G05B 19/4185; G05B 19/058; G05B 2219/14083; G05B 2219/32136
See application file for complete search history.

(56) References Cited

U.S. PATENT DOCUMENTS

| | | | |
|---|---|---|---|
| 5,710,723 A * | 1/1998 | Hoth | G05B 23/024 |
| | | | 706/912 |
| 6,038,486 A | 3/2000 | Saitoh et al. | |
| 6,199,018 B1 * | 3/2001 | Quist | G01M 13/045 |
| | | | 706/912 |

(Continued)

FOREIGN PATENT DOCUMENTS

| | | |
|---|---|---|
| CN | 101263499 A | 9/2008 |
| CN | 105631577 A | 6/2016 |

(Continued)

*Primary Examiner* — Stephen Holwerda
(74) *Attorney, Agent, or Firm* — John A. Miller; Shumaker, Loop & Kendrick, LLP

(57) ABSTRACT

A method for analyzing data provided by a robot system located in a plant. The method includes operating a plurality of robots in the robot system and collecting first level data concerning operating parameters of each robot while they are being operated. The method further includes analyzing the first level data in a first data collection device located in the plant using first level analyzation software, analyzing the analyzed first level data collected in a second data collection device using second level analyzation software, and analyzing the analyzed second level data collected in a third data collection device in the cloud using third level analyzation software. A web portal outside of the plant can be used to gain access to the analyzed third level data.

22 Claims, 6 Drawing Sheets

(56) References Cited

U.S. PATENT DOCUMENTS

| | | | |
|---|---|---|---|
| 6,298,308 B1* | 10/2001 | Reid | G05B 19/4185 |
| | | | 702/56 |
| 2005/0198034 A1* | 9/2005 | Boyer | G05B 19/4185 |
| 2006/0015195 A1* | 1/2006 | Lehman | G05B 19/4186 |
| | | | 700/83 |
| 2007/0067678 A1 | 3/2007 | Hosek et al. | |
| 2015/0127124 A1* | 5/2015 | Kobayashi | G05B 19/409 |
| | | | 700/83 |
| 2016/0098037 A1 | 4/2016 | Zornio et al. | |
| 2016/0149996 A1* | 5/2016 | Eckert | G05B 23/0264 |
| | | | 709/217 |

FOREIGN PATENT DOCUMENTS

| | | |
|---|---|---|
| CN | 106796419 A | 5/2017 |
| JP | 10161707 A | 6/1998 |

\* cited by examiner

ROBOTIC APPLICATION EQUIPMENT MONITORING AND PREDICTIVE ANALYTICS

CROSS-REFERENCE TO RELATED APPLICATIONS

This application claims the benefit of the filing date of U.S. Provisional Patent Application No. 62/596,193 filed Dec. 8, 2017, and titled Robotic Application Equipment Monitoring and Predictive Analytics.

FIELD OF THE INVENTION

The invention relates to real-time monitoring, optimization and predictive analytics of robotic equipment and components to avoid downtime and prevent quality problems.

BACKGROUND OF THE INVENTION

Modern manufacturing facilities often utilize a variety of robots to automate production processes. Robots may be arranged in cells, wherein several robots each perform the same process. For example, several robots may all be configured to perform an identical welding process on a work piece. Alternately, several robots may be utilized on an assembly line, wherein each robot performs unique steps of a production sequence.

Although robots are effective for maximizing efficiency, they are not without drawbacks. Unlike their human counterparts, robots are generally unable to communicate when they may experience a problem. For example, bearings or encoders of the robot may fail after a period of time without warning based on variable operating conditions, such as travel distances, temperatures, and load conditions.

Under standard operating conditions, maintenance periods may be scheduled at regular intervals. However, regularly scheduled intervals may be excessive when operating conditions are less extreme than standard, resulting in components being replaced prematurely, and unnecessarily increasing maintenance costs.

Alternatively, regularly scheduled intervals may be insufficient where operating conditions are more extreme than standard. In this instance, the robots may experience unexpected problems before the scheduled maintenance period. Unexpected failures are particularly problematic in the case of high-volume production facilities for a variety of reasons.

First, production facilities generally try to minimize the number of spare parts that are inventoried in-house in an effort to minimize costs. Accordingly, replacement parts must often be ordered. In the case of robots, many replacement parts may have long lead times, resulting in extended periods of time that the robot remains inoperable.

Additionally, production schedules are generally planned days or weeks in advance, wherein each of the robots in the production facility is expected to output a predetermined amount of work. Unexpected downtime of a single robot may negatively impact an entire production facility, as manufacturing processes downstream of the inoperable robot may be starved of expected work pieces. As a result, production may fall behind schedule.

Some known robotic systems employ a programmable logic controller (PLC) to learn and monitor output commands of application robotic equipment. Data recording macros are inserted throughout the robotic path program to signal the PLC to perform some action, such as either learn a command or report back a failed status. However, these types of robotic systems have many shortcomings. For example, it is labor intensive to add recording macro's throughout a robot path program where the process is understood to be stable. Further, custom PLC and PC software is required for each site for learning and monitoring process, which often affects multiple zones. Also, access to internal robotic parameters cannot be used, the PLC memory is limited, and there is no robot optimization capability.

Accordingly, there exists a need in the art for a system and method for proactively determining necessary maintenance and optimization of robots in order to schedule and minimize downtime, extend mechanical life of the robot, and reduce maintenance costs.

SUMMARY OF THE INVENTION

The following discussion discloses and describes a system and method for analyzing data provided by a robot system located in a plant. The method includes operating a plurality of robots in the robot system and collecting first level data concerning operating parameters of each robot while they are being operated. The method further includes sending the collected first level data from the robots to a first data collection device located in the plant and analyzing the collected first level data in the first data collection device using first level analyzation software. The method also includes sending the analyzed first level data from the first data collection device to a second data collection device located in the plant and analyzing the analyzed first level data collected in the second data collection device using second level analyzation software. The method further includes sending the analyzed second level data from the second collection device out of the plant to a third data collection device in a network cloud and analyzing the analyzed second level data collected in the third data collection device in the cloud using third level analyzation software. A web portal outside of the plant can be used to gain access to the analyzed third level data.

DESCRIPTION OF THE FIGURES

The above, as well as other advantages of the present invention, will become readily apparent to those skilled in the art from the following detailed description, particularly when considered in the light of the drawings described herein.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1:
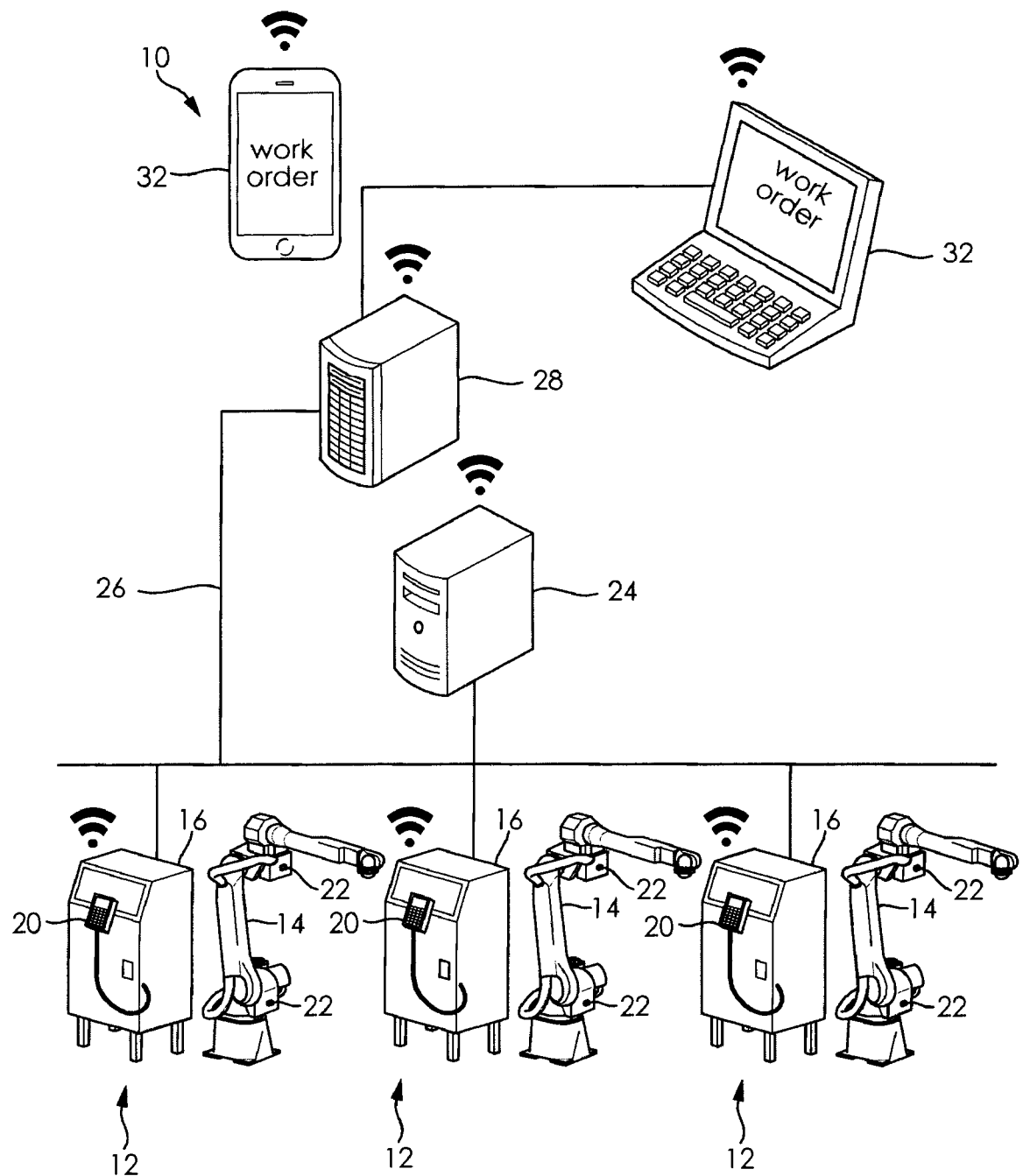
FIG. 1 is a schematic diagram of a system according to a first embodiment of the disclosure.
Figure 2:
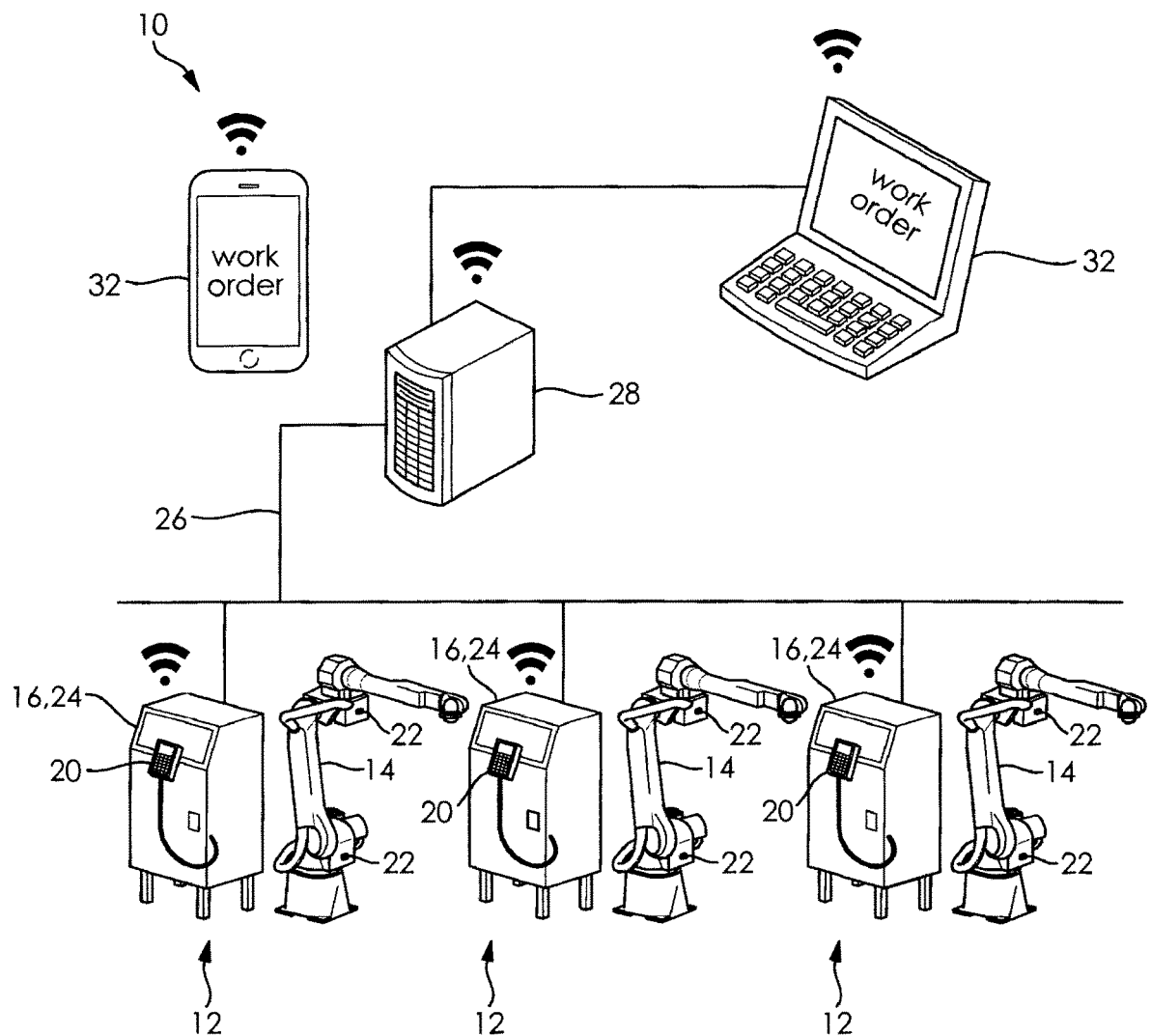
FIG. 2 is a schematic diagram of a system according to a second embodiment of the disclosure.
Figure 3:
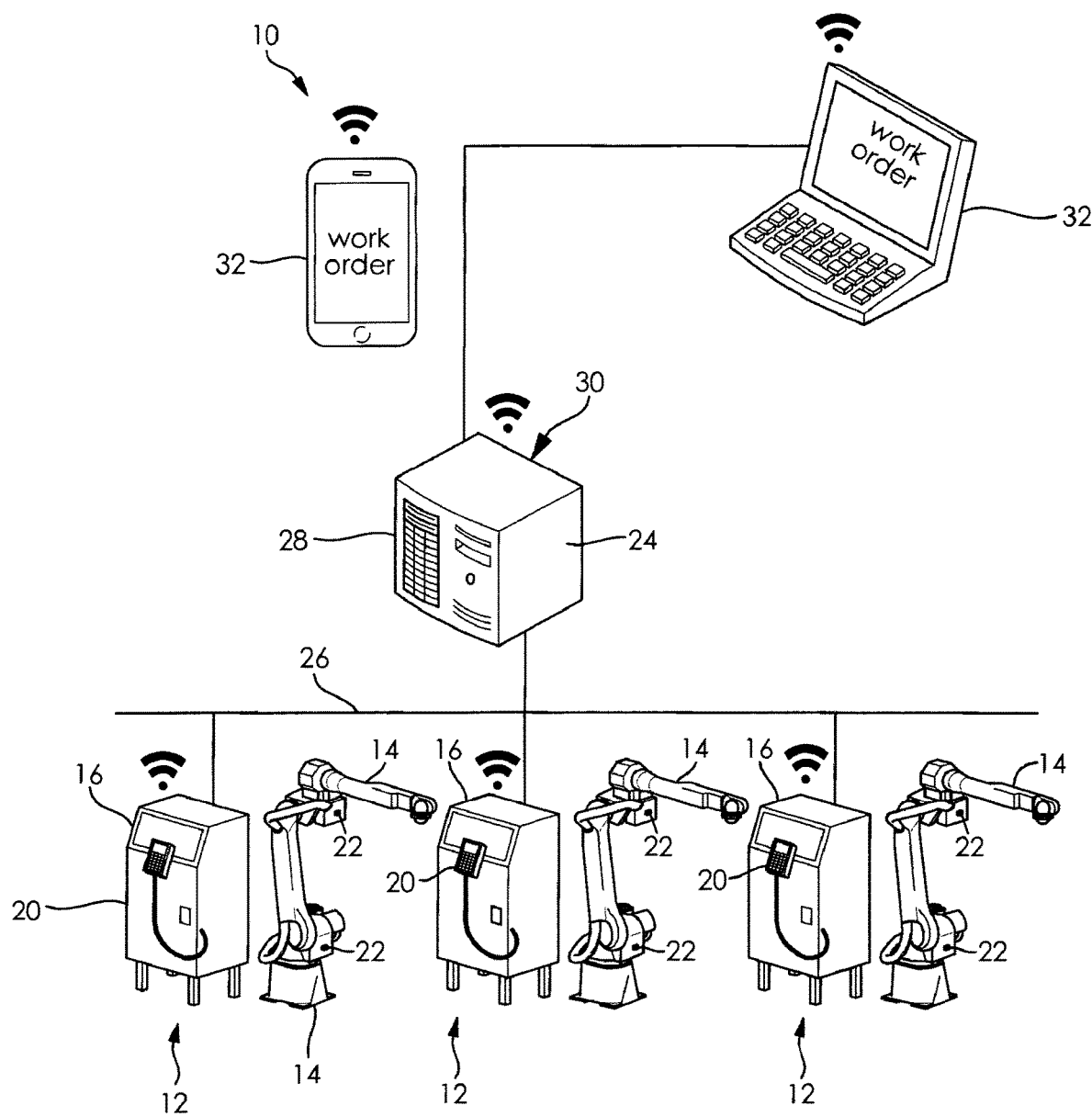
FIG. 3 is a schematic diagram of a system according to a third embodiment of the disclosure.

As shown in FIGS. 1-3, a system 10 for minimizing downtime includes at least one robot 12. In the illustrated embodiment, the system 10 includes a plurality of robots 12. Each of the robots 12 includes a multi-axis robotic arm 14 configured to perform an action on a workpiece, such as cutting, welding, or manipulation, for example.

The robot 12 includes at least one programmable controller 16 having a memory storage device for storing a plurality of types of data. As used herein, a "controller" is defined as including a computer processor configured to execute software or a software program in the form of instructions stored on the memory storage device. The storage device may be any suitable memory type or combination thereof. As also used herein, a "storage device" is defined as including a non-transitory and tangible computer-readable storage medium on which the software or the software program, as well as data sets, tables, algorithms, and other information, may be stored. The controller 16 may be in electrical communication with the memory storage device for purposes of executing the software or the software program.

The controller 16 may include a user interface 20 for allowing a user to enter data or programs into the controller 16, or for accessing the data stored therein. The user interface 20 may include a display for displaying the information to the user.

The controller 16 may be a robot controller 16, wherein in such a case, the controller 16 is coupled to the robot 12 for actively performing a variety of actions. It is understood that the present invention is not limited to robot controllers 16. As a non-limiting example, the controller 16 may be a passive controller 16, such as a monitoring device that monitors predetermined conditions of the robot 12.

A plurality of sensors 22 on the robot 12 collect dynamic data from the robotic arm 14 based on the predetermined conditions. The sensors 22 may include odometers for measuring robotic arm joint travel distance and direction, thermometers for measuring joint operating temperatures, and load cells for measuring operating loads on the joints, for example. The sensors 22 are in communication with the controller 16, wherein the controller 16 collects the dynamic data from the sensors 22 in real-time.

The system 10 may further include a first data collection device 24 in real-time communication with the programmable controllers 16. As shown in FIGS. 1 and 3, the first data collection device 24 may be a physical disk located external to the controllers 16, wherein the first data collection device 24 is in communication with the plurality of the controllers 16 via a functional network 26. In an alternate embodiment of the system 10, the first data collection device 24 may be a logical or virtual disk incorporated in the memory storage device of the controller 16 of each robot 12, as shown in FIG. 2.

The functional network 26 may be a local or wide area network of the programmable controllers 16 or may be a direct link between the controllers 16 and the first data collection device 24. Further, the functional network 26 may include wireless communication capabilities, such as Wi-Fi, Bluetooth, or cellular data networks.

The first data collection device 24 includes a multi-segment queuing mechanism having a plurality of prioritized segments. For example, the queueing mechanism may have a high priority segment and a low priority segment. The queueing mechanism includes a data retention policy, and is configured to buffer the data based on at least one of an event, priority, duration, size, transfer rate, data transformation to optimize throughput, or data storage requirements.

The first data collection device 24 is configured to analyze the dynamic data received from the controllers 16, and to determine when maintenance or optimization of a particular robot 12 of the system 10 is necessary. Maintenance may include repair or replacement of specific components of the robot 12 based on anomalies or failures identified by the first data collection device 24. Optimization may involve changing parameters of the controller 16 to maximize efficiency of the robot 12.

At least one second data collection device 28 (optional) can be in communication with the first data collection device 24 via the functional network 26. The second data collection device 28 may be a network server configured to process the dynamic data received from the first data collection device 24. As shown in FIGS. 1 and 2, the second data collection device 28 may be an independent network server connected to the first data collection device 24 via the functional network 26. The second data collection device 28 may be located in the same room or building as the first data collection device 24, or it may be located in an entirely different building, which may or may not be located in the same geographic vicinity as the first data collection device 24.

As shown in FIG. 3, the second data collection device 28 may alternately be formed local to the first data collection device 24, wherein the integrally formed first data collection device 24 and second data collection device 28 from a data collection unit 30 in communication with each of the plurality of the controllers 16 via the functional network 26.

The system 10 further includes a recipient 32 in communication with at least one of the first data collection device 24 and the second data collection device 28 via the functional network 26. In the illustrated embodiments, the recipients 32 include a smart device, such as a cellular phone or a tablet, and a network terminal, such as a personal computer. However, the recipient 32 may be any device capable of receiving analyzed dynamic data from the second data collection device 28, such as a second server, application software, a web browser, an email, and a robot teaching device, for example. Alternately, the recipient 32 may be a person who receives a printout directly from the second data collection device 28.

Figure 4:
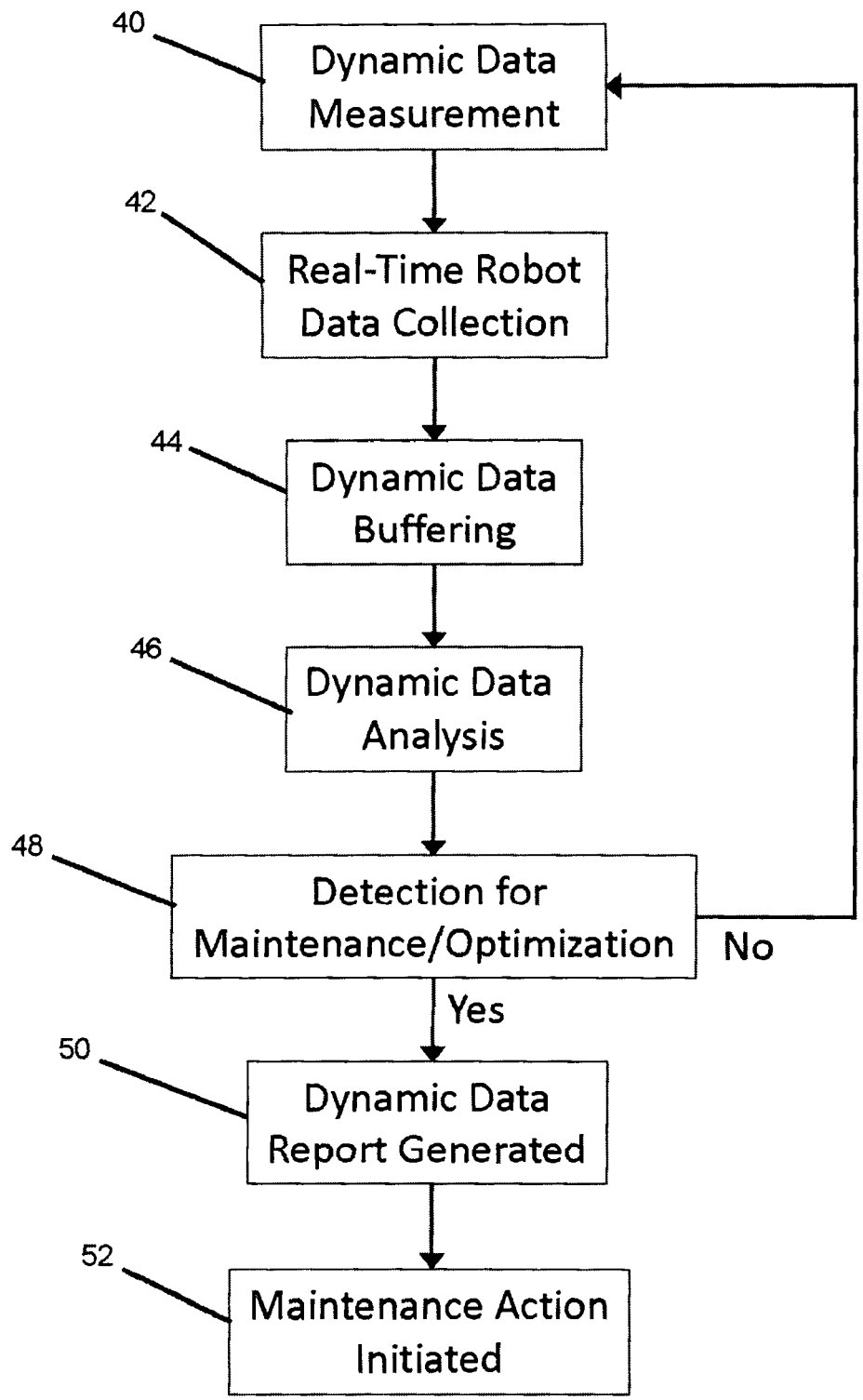
FIG. 4 is a flowchart diagram showing a method for diagnosing a robot state, according to one embodiment of the disclosure.

In use, as shown in FIG. 4, the sensors 22 of each of the robots 12 measure the dynamic data during operation (Step 40), including joint travelling distances, component operational load, component operational temperature, component high speed emergency stops, joint reverse travel conditions, and other dynamic data relevant to the operation of the robot.

The dynamic data measured by the sensors 22 is then collected (Step 42) by the controller 16 and transferred to or extracted by the first data collection device 24.

The dynamic data is buffered (Step 44) in at least one of the segments of the first data collection device 24 based on priority, wherein higher priority dynamic data is buffered in the higher priority segment, and lower priority dynamic data is buffered in the lower priority segment. It is understood that the queueing mechanism may include any number of prioritized segments, wherein respective dynamic data may be buffered.

The dynamic data is retained in the prioritized segments of the queueing mechanism based on the retention policy of the queuing mechanism. The retention policy retains and prioritizes the dynamic data based on at least one of a triggering event, priority, duration, size, transfer rate, data transformation to optimize throughput, or data storage requirements.

Upon occurrence of a triggering event, the dynamic data is transferred from the first data collection device 24 to the second data collection device 28. The triggering event may be received from the controller 16 or an external triggering device. Alternately, the event may be triggered internally by the first data collection device 24. In one embodiment, an entirety of the dynamic data stored in the first data collection device 24 may be transferred to the second data collection device 28 when the triggering event occurs. Alternately, upon occurrence of the triggering event, the first data collection device 24 may interrupt transfer of the lower priority dynamic data, and initiate a transfer of the higher priority dynamic data to the second data collection device 28.

Dynamic data received by the second data collection device 28 is then analyzed (Step 46) to determine whether maintenance or optimization of the robot 12 is necessary. The determination of maintenance or optimization (Step 48) is based on consideration of each type of the dynamic data. For example, the second data collection device 28 may evaluate travel distance, temperature, high speed emergency stops, joint reverse travel conditions, and other dynamic data in determining whether maintenance or optimization of any one of the plurality of the robots 12 is necessary. More particularly, intervals between maintenance periods may be increased or decreased where operating conditions of a robot 12 are determined to be less extreme or more extreme than standard operating conditions, respectively. For example, occurrences of high temperatures, high speed emergency stops, and joint reverse travel conditions may factor into a decreased interval between maintenance periods. In the alternative, the dynamic data can be analyzed by the first data collection device 24.

If the second data collection device 28 does not determine that maintenance or optimization is necessary, the data collection and analysis process may continue repeatedly (Branch at "No" from Step 48). Alternately, in the event that second data collection device 28 determines that maintenance or optimization of any of the robots 12 is necessary (Branch at "Yes" from Step 48), the second data collection device 28 may generate a report (Step 50) including a readout of the analyzed dynamic data. The report includes information related to detecting pre-failure conditions and minimizing system 10 downtime, including motion and mechanical health, process health, system health, and maintenance notifications.

The report may include specific information relating to particular robots 12 in the system 10. The report may include a maintenance or optimization notification identifying specific components of the robot 12 that need to be replaced, such as bearings, encoders, or controls, for example. The report may also provide projections relating to robots 12 that are approaching a need for maintenance or optimization, allowing the recipient 32 to optimize future production schedules based on anticipated downtime.

When the report includes a maintenance or optimization notification, the notification is provided to at least one of the recipients 32 so that a maintenance action may be initiated (Step 52). The notification is received by the recipient 32 and displayed to the user, so that the user may initiate the maintenance action, such as creating a work order or scheduling down time for the robot 12.

Alternately, the second data collection device 28 may be configured to initiate the maintenance action automatically. When the second data collection device 28 determines that any of the robots 12 requires maintenance, the second data collection device 28 may generate a work order, order replacement components, or schedule down time for the robot 12 without input from the user.

The system 10 disclosed herein advantageously improves efficiency of manufacturing facilities by minimizing downtime. For example, by collecting, storing, and analyzing dynamic data related to operating conditions of each robot 12, intervals between maintenance periods may be adjusted specifically to each individual robot 12.

In the case of the robots 12 subjected to more extreme operating conditions, intervals between maintenance periods can be reduced from a standard interval, and unexpected failures can be prevented. By scheduling maintenance periods based on dynamic data, the robot 12 downtime can be scheduled based on replacement component availability, and production schedules can be adjusted in advance to accommodate for reduced production capacity.

Alternately, when a robot 12 is subjected to less extreme operating conditions, intervals between maintenance periods can be extended beyond the standard interval, eliminating unnecessary replacement of components, and minimizing maintenance costs.

The present invention also proposes other robotic systems and methods that relate to real-time monitoring, optimization and predictive analytics of robotic equipment and process control components to avoid downtime caused by quality problems. These systems and methods of the invention have specific application for improving robotic systems that use a PLC to learn and monitor output commands of application equipment, where the system and method of the invention overcomes a number of shortcomings with these types of systems. It is noted that the systems and methods are described below in the context of paint process equipment, but, as will be appreciated by those skilled in the art, can be used with any suitable robotic process equipment.

One method includes automatic triggering to initiate recording of robotic process control related data when the process is stable, which is determined wholly within the controller software, where the recorded information is sent to an external device for analysis. Deep learning techniques are utilized. Optimization techniques can be used to improve throughput, material usage and quality.

Controller software employs process component control data that automatically transmits robotic process component control data to the external device when process control parameters change. All process control parameters, such as fluid flow, bell speed and shaping air flow rates, electrostatic high voltage requests, commands, sensor feedback, set-points, set-point status, motor torque; pressure sensors, bearing air status and regulator commands are among the data transferred.

Software in the external device located in the plant receives the controller messages and based on the message type either invokes analytic software or passes the message on to the second data collection device or to the cloud computer directly. Message data to be used with the analytic software is stored in a local database as analytics are invoked.

Analytics are performed on the process control parameters contained in the message together with data previously stored in the database. If the analytics detect an abnormal condition a message is sent to the affected robot controller indicating the abnormal status. Some examples of reported abnormal condition(s) would be that the flow rate is out of tolerance; set-point is not reached; electrostatic is abnormal;

process motor torque is abnormal; pressure is abnormal; or regulator is abnormal. The analytics report back status to the affected robot controller, which will in turn notify the user of impending problems and hold jobs in station so quality can be maintained. The result information is then sent to the second data collection device or cloud computer directly where additional analysis can be performed.

Figure 5:
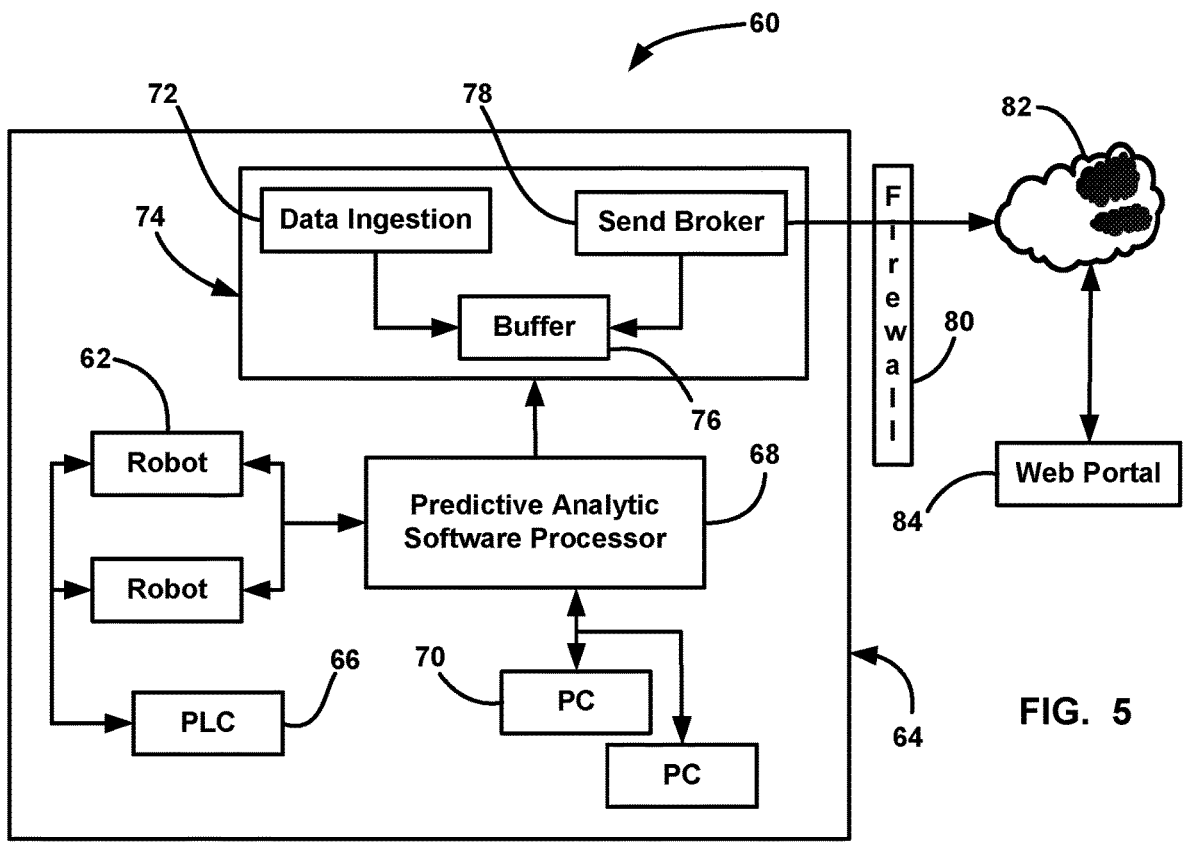
FIG. 5 is a schematic block diagram of plant network data flow system for robot operation analysis and control utilizing an embodiment of the disclosure.

FIG. 5 is a schematic block diagram of plant network data flow system 60 that embodies the various features of the systems and methods referred to above. The system 60 includes a number of robots 62 provided within a plant 64, where the robots 62 can perform any suitable task, such as painting a vehicle or welding. The robots 62 interface with a PLC 66 located in the plant 64, where the PLC 66 is used to respond to actions determined by the analytics discussed above. Configuration of the system 60 is automatic based on the message content sent from the robots 62 so that proper analytics can be executed based on the system type and self-learning operating conditions and analytics can be initiated. As discussed above, the robots 62 employ various sensors that provide data, messages and information concerning the health, operational status, specific processes, etc. to a plant process control parameter monitoring and predictive analytic software processor 68. The data may include, for example, process control parameter status(s), feedback messages, commands, robotic arm joint travel distance and direction, joint operating temperatures, loads on the joints, component operational load, component operational temperature, component high speed emergency stops, joint reverse travel conditions, and other dynamic data relevant to the operation of the robots 62.

The processor 68 analyzes the data from the robots 62 and reports the operational status including results of the analytics for the affected robots 62 to in plant processor (PCs) 70, which provide a user interface (UI) for set-up and display of the operational status for the affected robots 62 by communication through the processor 68. The processor 68 provides feedback to the robots 62 concerning their operational status and health based on the analysis of the data, where the feedback may include, for example, paint flow is out of tolerance, set-point has not been reached, electrostatics are not normal, process motor torque is abnormal, pressure is abnormal, regulator is abnormal, etc. The analyzed data is used to maintain uninterrupted operation of the robots 62; identify and update maintenance schedules; predict impending equipment failures; and provide tools to maintain and increase product quality. As discussed above, maintenance may include repair or replacement of specific components on the robots 62, such as bearings, encoders, process control components, etc., based on identified anomalies. Optimization may involve changing process control parameters of the robots 62 to maximize efficiency of the robots 62.

A data analysis and ingestion processor 72 within a data collector software 74 receives the data from the software processor 68, and performs various conditioning on the already analyzed data of the type discussed above. It is noted that in some cases no analytics need to be performed on the data from the robots 62, where the processor 68 would operate as a pass through of the data from the robots 62 to the data collector software 74. The conditioned and analyzed data from the processor 72 is held or queued in a buffer 76 in the data collector 74, where, for example, higher priority dynamic data is buffered in a higher priority segment, and lower priority dynamic data is buffered in a lower priority segment. More particularly, the queueing mechanism in the buffer 76 may include any number of prioritized segments, where respective dynamic data may be buffered. Based on the priority schedule, the buffer 76 selectively provides the analyzed data to a send broker 78 in the data collector software 74 that selectively and periodically sends the analyzed and conditioned data out of the plant 64 through a firewall 80 to a cloud computer 82, where further analytics can be performed on the data including data from multiple locations.

The data stored in the cloud computer 82 can be accessed by a web portal 84 that can view the analyzed data results, perform additional trending and analysis, provide controller status, provide notification and reports, review data from any PC or smart device connected to the web, etc. The cloud computer 82 provides a number of advantages for holding and analyzing the data from the plant 64 including reducing the analytic software database memory impact, changing analytics at one location for all plants, providing minimal robot changes, and providing alerts sent to multiple engineers.

Figure 6:
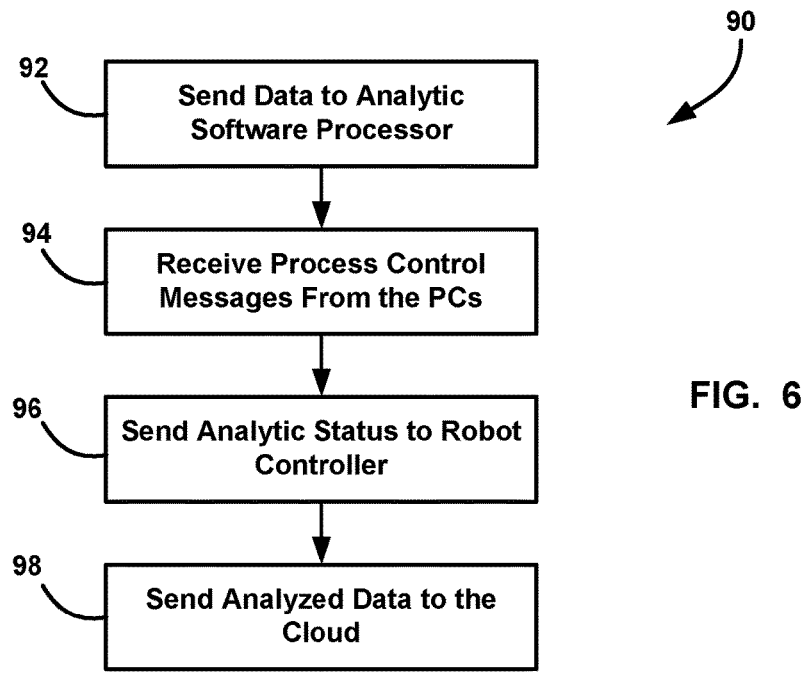
FIG. 6 is a flow chart diagram showing a process for analyzing data in the system shown in FIG. 5.

FIG. 6 is a flow chart diagram 90 showing a process for data flow analysis in the system 60, as discussed above. At box 92, the robots 62 send process equipment control information and data discussed above to the analytic software processor 68 for analysis. At box 94, the software processor 68 receives process control messages from the PCs 70, performs analytics on the data received from the robots 62 and sends responses and messages to the PCs 70, the robot controllers 62 and the data collector software 74. At box 96, the robots 62 send analytic status information to the PLC 66. At box 98, the send broker 78 sends the analyzed data to the cloud computer 82 for storage and additional analytics.

Figure 7:
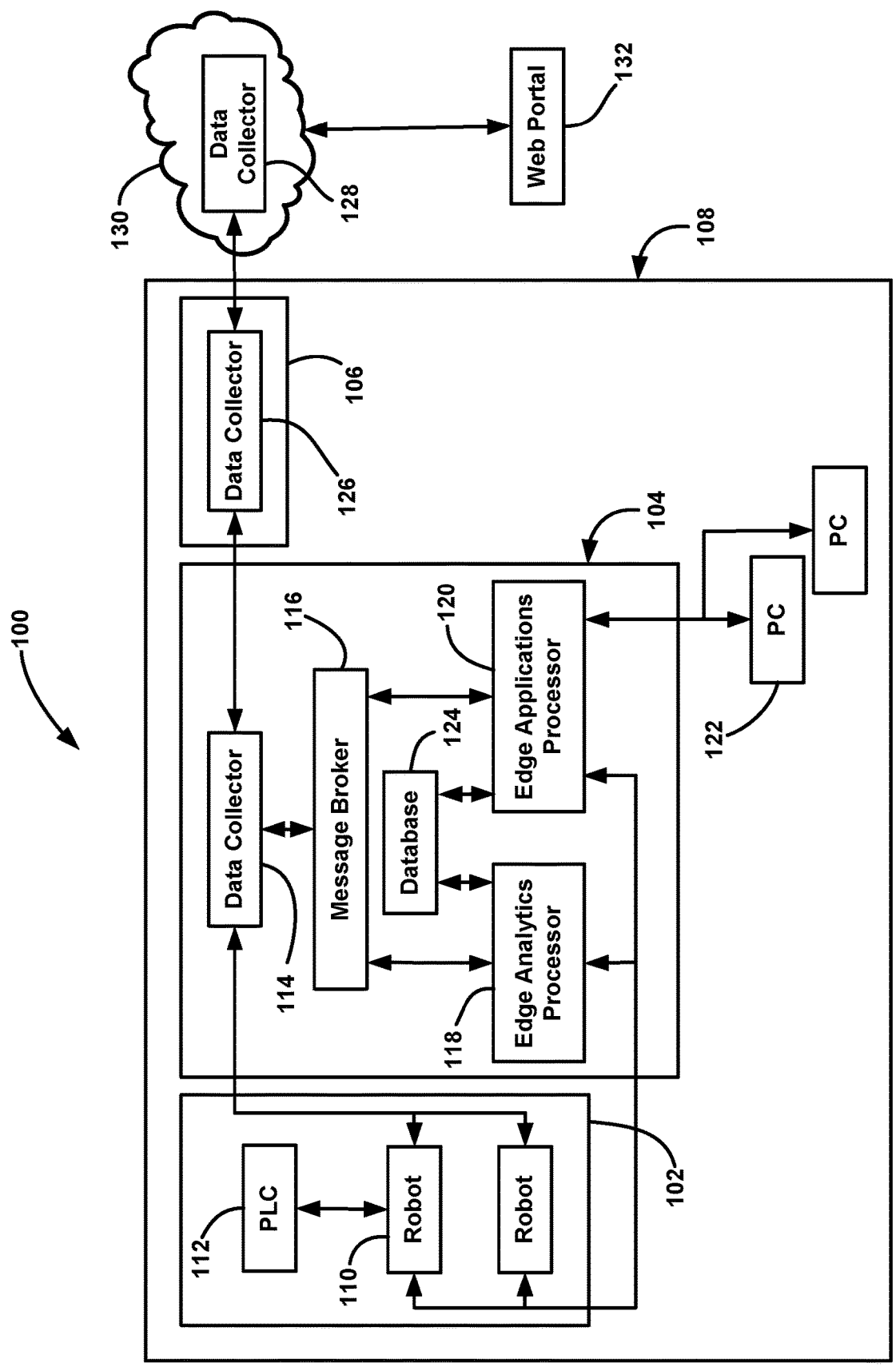
FIG. 7 is a block diagram of a zero down time (ZDT) collection architecture for robot operation analysis and control utilizing an embodiment of the disclosure.

FIG. 7 is a schematic block diagram of a ZDT collection architecture 100 that has similar elements and operates in a similar manner to the system 60. The architecture 100 includes a production zone 102, a level 1 collector 104 and an optional level 2 collector 106 all located within a plant 108, where the level 1 collector 104 generally represents the analytic processor 68 and includes a number of processing elements discussed below, and the level 2 collector 106 generally represents the ZDT data collector 74.

The production zone 102 includes a number of robots 110 that are controlled by a PLC 112 in the manner discussed above. The robots 110 provide data and information to a data collector 114 in the level 1 collector 104 that stores the data and messages for subsequent processing. The data collector 114 provides the data and messages to a message broker 116 that queues the data and determines where and when the messages, data and information will be processed and sent. More specifically, the message broker 116 will receive the data and messages from multiple robots 110 at various points in time, where the messages need to be selectively provided for processing and analytics. The message broker 116 is in communication with an edge analyzer processor 118 and an edge applications processor 120, where the edge analyzer processor 118 and the edge applications processor 120 trade information, messages and data with the robots 110, for example, robot status information, consistent with the discussion herein. The edge applications processor 120 provides an interface to a UI PC 122 so as to allow a user to monitor the operation of the robots 110, where the edge applications processor 120 can obtain processed and analyzed data from a database 124. The edge analyzer processor 118 processes and analyzes the data from the message broker 116 and stores it in the database 124. The analyzed data is transferred from the database 124 through the edge analyzer processor 118, the message broker 116 and the data collector 114 to a data collector 126 in the optional level 2 collector 106, where it is further analyzed and sent out of the plant 108 to a level 3 collector 128 in a cloud computer 130 that further analyzes the data as discussed above. The analyzed information provided by the level 1 collector 104 is used in the plant 108, and some or all of that information that is collected by the data collector 126 is selectively provided to the cloud computer 130. A web portal 132 is able to access the data from the cloud computer 130 as discussed above.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for analyzing data provided by a robot system located in a plant, said method comprising:
    operating a plurality of robots in the robot system;
    collecting first level data by the robots concerning operating parameters of each robot while they are being operated;
    sending the collected first level data from the robots to a first data collection device located in the plant, including recording and sending process control data from a particular one of the robots being triggered when the particular robot determines that it is performing a process in a stable manner;
    analyzing the collected first level data in the first data collection device using first level analyzation software;
    sending the analyzed first level data from the first data collection device to a second data collection device located in the plant, including the sending being initiated based on an occurrence of a triggering event, where notification of the triggering event comes from a robot controller, an external triggering device, or internally from the first data collection device;
    analyzing the analyzed first level data collected in the second data collection device using second level analyzation software;
    sending the analyzed second level data from the second collection device out of the plant to a third data collection device in a network cloud; and
    analyzing the analyzed second level data collected in the third data collection device in the cloud using third level analyzation software.

2. The method according to claim 1 further comprising accessing the analyzed third level data by a web portal outside of the plant.

3. The method according to claim 2 wherein the web portal allows viewing of the analyzed third level data, performing trending and analysis of the analyzed third level data, provide controller status in the plant, provide notification and reports, and review data from PCs or smart devices connected to the cloud.

4. The method according to claim 1 further comprising storing and buffering the analyzed first level data in a buffer in the first data collection device, queueing the analyzed first level data in the buffer, and determining where and when the analyzed first level data will be processed and sent from the buffer.

5. The method according to claim 1 further comprising storing and buffering the analyzed second level data in a buffer in the second data collection device, queueing the analyzed second level data in the buffer, and determining where and when the analyzed second level data will be processed and sent from the buffer.

6. The method according to claim 1 further comprising reporting robot status to the robots based on the analysis of the collected first level data in the first data collection device.

7. The method according to claim 6 wherein the robot status includes information relating to robot health and maintenance.

8. The method according to claim 1 wherein the robots are controlled by a programmable logic controller.

9. The method according to claim 1 wherein the first data collection device sometimes acts as a pass through of the first level data to the second collection device, where the first level data becomes the second level data.

10. The method according to claim 1 wherein the first level data includes one or more of fluid flow rate, feedback messages, commands, robotic arm joint travel distance and direction, joint operating temperatures, loads on the joints, component operational load, component operational temperature, component high speed emergency stops, and joint reverse travel conditions.

11. The method according to claim 1 further comprising initiating a maintenance action or changing a maintenance interval on one or more of the robots in the robot system, by the second data collection device based on results of the analyzing by the second level analyzation software.

12. The method according to claim 1 wherein, upon occurrence of the triggering event, the first data collection device interrupts transfer of lower priority data and initiates transfer of higher priority data to the second data collection device.

13. A method for analyzing data provided by a robot system located in a plant, said method comprising:
    operating a plurality of robots in the robot system that are controlled by a programmable logic controller;
    collecting first level data by the robots concerning operating parameters of each robot while they are being operated;
    sending the collected first level data from the robots to a first data collection device located in the plant, including recording and sending process control data from a particular one of the robots being triggered when the particular robot determines that it is performing a process in a stable manner;
    analyzing the collected first level data in the first data collection device using first level analyzation software;
    storing and buffering the analyzed first level data in the first data collection device, queueing the analyzed first level data in a first buffer, and determining where and when the analyzed first level data will be processed and sent from the first buffer;
    sending the analyzed first level data from the first data collection device to a second data collection device located in the plant, including the sending being initiated based on an occurrence of a triggering event, where notification of the triggering event comes from a robot controller, an external triggering device, or internally from the first data collection device;
    analyzing the analyzed first level data collected in the second data collection device using second level analyzation software;
    storing and buffering the analyzed second level data in the second data collection device, queueing the analyzed second level data in a second buffer, and determining where and when the analyzed second level data will be processed and sent from the second buffer;

sending the analyzed second level data from the second collection device out of the plant to a third data collection device in a network cloud;

analyzing the analyzed second level data collected in the third data collection device in the cloud using third level analyzation software; and accessing the analyzed third level data by a web portal outside of the plant.

14. The method according to claim 13 further comprising reporting robot status to the robots based on the analysis of the collected first level data in the first data collection device.

15. The method according to claim 13 wherein the first data collection device sometimes acts as a pass through of the first level data to the second collection device, where the first level data becomes the second level data.

16. An analysis system for analyzing data provided by a robot system located in a plant, said analysis system comprising:

means for operating a plurality of robots in the robot system;

means for collecting first level data by the robots concerning operating parameters of each robot while they are being operated;

means for sending the collected first level data from the robots to a first data collection device located in the plant, including means for recording and sending process control data from a particular one of the robots which is triggered when the particular robot determines that it is performing a process in a stable manner;

means for analyzing the collected first level data in the first data collection device using first level analyzation software;

means for sending the analyzed first level data from the first data collection device to a second data collection device located in the plant, including means for the sending being initiated based on an occurrence of a triggering event, where notification of the triggering event comes from a robot controller, an external triggering device, or internally from the first data collection device;

means for analyzing the analyzed first level data collected in the second data collection device using second level analyzation software;

means for sending the analyzed second level data from the second collection device out of the plant to a third data collection device in a network cloud; and means for analyzing the analyzed second level data collected in the third data collection device in the cloud using third level analyzation software.

17. The analysis system according to claim 16 further comprising means for accessing the analyzed third level data by a web portal outside of the plant.

18. The analysis system according to claim 16 further comprising means for storing and buffering the analyzed first level data in the first data collection device, queueing the analyzed first level data, and determining where and when the analyzed first level data will be processed and sent.

19. The analysis system according to claim 16 further comprising means for storing and buffering the analyzed second level data in the second data collection device, queueing the analyzed second level data, and determining where and when the analyzed second level data will be processed and sent.

20. The analysis system according to claim 16 further comprising means for reporting robot status to the robots based on the analysis of the collected first level data in the first data collection device.

21. The analysis system according to claim 16 wherein the robots are controlled by a programmable logic controller.

22. The analysis system according to claim 16 wherein means for analyzing the collected first level data sometimes acts as a pass through of the first level data to the second collection device.

* * * * *